United States Patent
Zhamu et al.

(10) Patent No.: US 10,435,797 B2
(45) Date of Patent: Oct. 8, 2019

(54) ELECTROCHEMICAL PRODUCTION OF GRAPHENE SHEETS FROM COKE OR COAL

(71) Applicant: Nanotek Instruments, Inc., Dayton, OH (US)

(72) Inventors: Aruna Zhamu, Spingboro, OH (US); Bor Z. Jang, Centreville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 57 days.

(21) Appl. No.: 15/193,090

(22) Filed: Jun. 26, 2016

(65) Prior Publication Data
US 2017/0370009 A1 Dec. 28, 2017

(51) Int. Cl.
*C25B 3/00* (2006.01)
*C25B 1/00* (2006.01)
(Continued)

(52) U.S. Cl.
CPC ............... *C25B 1/00* (2013.01); *C01B 32/19* (2017.08); *C25B 9/162* (2013.01); *C25B 11/14* (2013.01); *C25D 3/00* (2013.01)

(58) Field of Classification Search
CPC .......................... C25B 3/00–04; C25B 11/14
See application file for complete search history.

(56) References Cited

U.S. PATENT DOCUMENTS

| 4,931,213 A | 6/1990 | Cass |
| 5,753,388 A | 5/1998 | Koksbang et al. |

(Continued)

FOREIGN PATENT DOCUMENTS

| EP | 2975001 A1 * | 1/2016 | ............ B82Y 30/00 |
| JP | 2015160945 A | 9/2015 | |

(Continued)

OTHER PUBLICATIONS

Mallouk et al; "Non-oxidative intercalation and exfoliation of graphite by Bronsted acids" Nature Chemistry, 2014, p. 957-963 (Year: 2014).*

(Continued)

*Primary Examiner* — Brian W Cohen

(57) ABSTRACT

A method of producing graphene sheets from coke or coal powder, comprising: (a) forming an intercalated coke or coal compound by electrochemical intercalation conducted in an intercalation reactor, which contains (i) a liquid solution electrolyte comprising an intercalating agent; (ii) a working electrode that contains the powder in ionic contact with the liquid electrolyte, wherein the coke or coal powder is selected from petroleum coke, coal-derived coke, mesophase coke, synthetic coke, leonardite, lignite coal, or natural coal mineral powder; and (iii) a counter electrode in ionic contact with the electrolyte, and wherein a current is imposed upon the working electrode and the counter electrode for effecting electrochemical intercalation of the intercalating agent into the powder; and (b) exfoliating and separating graphene planes from the intercalated coke or coal compound using an ultrasonication, thermal shock exposure, mechanical shearing treatment, or a combination thereof to produce isolated graphene sheets.

22 Claims, 2 Drawing Sheets

(51) Int. Cl.
*C25D 3/00* (2006.01)
*C25B 11/14* (2006.01)
*C25B 9/16* (2006.01)
*C01B 32/19* (2017.01)

(56) References Cited

U.S. PATENT DOCUMENTS

| | | |
|---|---|---|
| 6,872,330 B2 | 3/2005 | Mack |
| 7,071,258 B1 | 7/2006 | Jang |
| 7,327,000 B2 | 2/2008 | DeHeer |
| 7,623,340 B1 | 11/2009 | Song |
| 7,790,285 B2 | 9/2010 | Zhamu et al. |
| 7,948,739 B2 | 5/2011 | Zhamu |
| 8,227,685 B2 * | 7/2012 | Choi ............... B82Y 30/00 136/252 |
| 8,696,938 B2 | 4/2014 | Zhamu et al. |
| 8,947,854 B2 | 2/2015 | Zhamu et al. |
| 2005/0271574 A1 | 12/2005 | Jang |
| 2008/0048152 A1 | 2/2008 | Jang |
| 2008/0268318 A1 | 10/2008 | Jang et al. |
| 2008/0279756 A1 | 11/2008 | Zhamu et al. |
| 2009/0028778 A1 * | 1/2009 | Zhamu ............... B82Y 30/00 423/448 |
| 2009/0061312 A1 | 3/2009 | Zhamu |
| 2009/0155578 A1 * | 6/2009 | Zhamu ............... B82Y 30/00 428/336 |
| 2010/0021819 A1 | 1/2010 | Zhamu |
| 2010/0044646 A1 | 2/2010 | Zhamu et al. |
| 2010/0272628 A1 | 10/2010 | Kim et al. |
| 2011/0017585 A1 | 1/2011 | Zhamu et al. |
| 2011/0159372 A1 | 6/2011 | Zhamu et al. |
| 2011/0287304 A1 | 11/2011 | Zinck et al. |
| 2012/0077080 A1 | 3/2012 | Liu et al. |
| 2012/0113565 A1 | 5/2012 | Kim et al. |
| 2012/0237435 A1 | 9/2012 | Petrik |
| 2013/0001089 A1 | 1/2013 | Li et al. |
| 2013/0052538 A1 | 2/2013 | Pasta et al. |
| 2013/0161199 A1 | 6/2013 | Li et al. |
| 2013/0171502 A1 | 7/2013 | Chen et al. |
| 2013/0319870 A1 | 12/2013 | Chen et al. |
| 2013/0329366 A1 | 12/2013 | Wang et al. |
| 2014/0027299 A1 * | 1/2014 | Loh ............... B82Y 40/00 205/338 |
| 2014/0072871 A1 | 3/2014 | Chen et al. |
| 2014/0107326 A1 * | 4/2014 | Swager ............... B82Y 30/00 534/558 |
| 2014/0242275 A1 | 8/2014 | Zhamu et al. |
| 2015/0027900 A1 * | 1/2015 | Dryfe ............... C25B 1/00 205/555 |
| 2015/0064574 A1 | 3/2015 | He et al. |
| 2015/0232340 A1 | 8/2015 | Bao et al. |
| 2015/0239741 A1 | 8/2015 | Burton et al. |
| 2016/0019995 A1 | 1/2016 | Zhamu et al. |
| 2016/0043384 A1 | 2/2016 | Zhamu et al. |
| 2016/0060122 A1 | 3/2016 | Tour et al. |
| 2016/0079001 A1 | 3/2016 | Lin et al. |

FOREIGN PATENT DOCUMENTS

| | | | |
|---|---|---|---|
| WO | 2014087992 A1 | 6/2014 | |
| WO | WO-2014140399 A1 * | 9/2014 | ............ B82Y 30/00 |
| WO | 2015015386 A1 | 2/2015 | |
| WO | 2015121613 A1 | 8/2015 | |
| WO | 2016075465 A1 | 5/2016 | |

OTHER PUBLICATIONS

Bor Z. Jang and A. Zhamu, "Processing of Nano Graphene Platelets (NGPs) and NGP Nanocomposites: A Review," J. Materials Sci. 43 (2008) 5092-5101.
William S. Hummers, Jr., et al., Preparation of Graphitic Oxide, Journal of the American Chemical Society, 1958, p. 1339.
Yang, et al. "Two-dimensional Graphene Nano-ribbons," J. Am. Chem. Soc. 130 (2008) 4216-17.
Reid, R.C.; Prausnitz, J.M. and Poling, B.E, The Properties of Gases and Liquids, McGraw-Hill, New York, p. 987.
PCT/US17/35770, International Search Report dated Sep. 1, 2017, 8 pages.
PCT/US17/35779 International Search Report and Written Opinion dated Aug. 17, 2017, 7 pages.
PCT/US17/36029 International Search Report and Written Opinion dated Aug. 29, 2017, 9 pages.
PCT/US17/36030 International Search Report and Written Opinion dated Sep. 6, 2017, 11 pages.
PCT/US17/36054 International Search Report and Written Opinion dated Aug. 16, 2017, 9 pages.
PCT/US17/36056 International Search Report and Written Opinion dated Aug. 10, 2017, 13 pages.
Stankovich et al., "Stable aqueous dispersions of graphitic nanoplatelets via the reduction of exfoliated graphite oxide in the presence of poly(sodium 4-styrenesulfonate)" Journal of Materials Chemistry (2005) vol. 16, pp. 155-158.
U.S. Appl. No. 15/193,090 Nonfinal Office Action dated Mar. 15, 2018, 18 pages.
U.S. Appl. No. 15/193,092 Nonfinal Office Action dated Dec. 14, 2017, 11 pages.
U.S. Appl. No. 15/211,408 Nonfinal Office Action dated Dec. 14, 2017, 10 pages.
WO-2014140399 English language translation from Espacenet.

* cited by examiner

US 10,435,797 B2

ELECTROCHEMICAL PRODUCTION OF GRAPHENE SHEETS FROM COKE OR COAL

FIELD OF THE INVENTION

The present invention relates to a method of producing isolated thin graphene sheets (single-layer or few-lay) directly from natural coal or coal derivatives (e.g. needle coke).

BACKGROUND

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for chemical-free production of isolated nano graphene platelets that is novel in that is does not follow the established methods for production of nano graphene platelets outlined below. In addition, the process is of enhanced utility in that it is cost effective, and provided novel graphene materials with significantly reduced environmental impact. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) Both heat- and solution-induced exfoliation approaches require a very tedious washing and purification step. For instance, typically 2.5 kg of water is used to wash and recover 1 gram of GIC, producing huge quantities of waste water that need to be properly treated.

(5) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(6) Furthermore, the quantity of intercalation solution retained on the flakes after draining may range from 20 to 150 parts of solution by weight per 100 parts by weight of graphite flakes (pph) and more typically about 50 to 120 pph.

(7) During the high-temperature exfoliation, the residual intercalate species (e.g. sulfuric acid and nitric acid) retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to overcome the limitations outlined above.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium metal melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and damaged), more electrically conductive, and larger/wider graphene sheets.

Furthermore, the prior art processes for graphene production all begin with highly purified natural graphite. The purification of graphite ore involves the use of undesirable chemicals. Clearly, a need exists to have a more cost-effective process that produces graphene sheets (particularly single-layer graphene and few-layer graphene sheets) directly from coal or coal derivatives. Such a process not only avoids the environment-polluting graphite ore purification procedures but also makes it possible to have low-cost graphene available. As of today, the graphene, as an industry, has yet to emerge mainly due to the extremely high graphene costs that have thus far prohibited graphene-based products from being widely accepted in the marketplace.

SUMMARY OF THE INVENTION

The present invention provides a method of producing isolated graphene sheets having an average thickness smaller than 10 nm (preferably and typically single-layer graphene or few-layer graphene) directly from a coke or coal powder having hexagonal carbon atomic interlayers (graphene planes or graphene domains) with an interlayer spacing (inter-graphene plane spacing). The method comprises:
(a) forming an intercalated coke or coal compound by an electrochemical intercalation procedure which is conducted in an intercalation reactor, wherein the reactor contains (i) a liquid solution electrolyte comprising an intercalating agent; (ii) a working electrode that contains the coke (including needle coke from petroleum or coal sources) or coal powder as an active material in ionic contact with said liquid solution electrolyte, wherein said coke or coal powder is selected from petroleum coke, coal-derived coke, meso-phase coke, synthetic coke, leonardite, anthracite coal, lignite coal, bituminous coal, natural coal mineral powder (e.g. including any coal or coke powder that either has never been previously heat-treated at a temperature above 1,500° C. or has been graphitized at a graphitization temperature above 1,500° C.), or a combination thereof; and (iii) a counter electrode in ionic contact with the liquid solution electrolyte, and wherein a current is imposed upon the working electrode and the counter electrode at a current density for a duration of time sufficient for effecting electrochemical intercalation of the intercalating agent into the interlayer spacing; and
(b) exfoliating and separating said hexagonal carbon atomic interlayers from the intercalated coke or coal compound using an ultrasonication, thermal shock exposure, mechanical shearing treatment, or a combination thereof to produce the isolated graphene sheets.

In some embodiments, multiple particles of the coke or coal powder are dispersed in the liquid solution electrolyte, disposed in a working electrode compartment, and supported or confined by a current collector in electronic contact therewith, and wherein the working electrode compartment and these multiple particles supported thereon or confined therein are not in electronic contact with the counter electrode. Preferably, these multiple particles of coke (e.g. needle coke) or coal are clustered together to form a network of electron-conducting pathways.

In some embodiments, the reactor further contains a graphene plane-wetting agent dissolved in the liquid solution electrolyte. Preferably, the graphene plane-wetting agent is selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), or a combination thereof. This agent is surprisingly found to be very effective in promoting electrochemical intercalation, exfoliation, and/or separation of graphene sheets.

The method may be practiced by following a process that is conducted intermittently or continuously and the supply of coke or coal powder and the liquid solution electrolyte are provided into the reactor intermittently or continuously. In some embodiments, the coke or coal powder in the working electrode compartment is dispersed in the liquid solution electrolyte at a concentration higher than 20% by weight. In some embodiments, the coke or coal powder in the working electrode compartment is dispersed in the liquid solution electrolyte at a concentration higher than 50% by weight.

In the invented method, the mechanical shearing treatment may comprise operating air milling, air jet milling, ball milling, rotating-blade mechanical shearing, or a combination thereof. In some embodiments, the imposing current provides a current density in the range of 0.1 to 600 A/m$^2$, preferably in the range of 1 to 500 A/m$^2$, and further preferably in the range of 10 to 300 A/m$^2$.

In some embodiments, the thermal shock exposure comprises heating said intercalated coke or coal compound to a temperature in the range of 300-1,200° C. for a period of 15 seconds to 2 minutes.

In some embodiments, the isolated graphene sheets contain single-layer graphene, or few-layer graphene having 2-10 hexagonal carbon atomic interlayers or graphene planes.

In some embodiments, the electrochemical intercalation includes intercalation of both an intercalating agent and a wetting agent into the interlayer spacing.

In some embodiments, the method further comprises a step of re-intercalating the isolated graphene sheets (if not single-layer graphene sheets) using an electrochemical or chemical intercalation method to obtain intercalated graphene sheets and a step of exfoliating and separating the intercalated graphene sheets to produce single-layer graphene sheets using ultrasonication, thermal shock exposure, exposure to water solution, mechanical shearing treatment, or a combination thereof.

In some embodiments, the intercalating agent includes a species selected from a Brønsted acid selected from phosphoric acid ($H_3PO_4$), dichloroacetic ($Cl_2CHCOOH$), or an alkylsulfonic acid selected from methanesulfonic ($MeSO_3H$), ethanesulfonic ($EtSO_3H$), or 1-propanesulfonic (n-$PrSO_3H$), or a combination thereof. The intercalating agent can include a metal halide.

In some embodiments, the intercalating agent includes a metal halide selected from the group consisting of MCl (M=Li, Na, K, Cs), $MCl_2$ (M=Zn, Ni, Cu, Mn), $MCl_3$ (M=Al, Fe, Ga), $MCl_4$ (M=Zr, Pt), $MF_2$ (M=Zn, Ni, Cu, Mn), $MF_3$ (M=Al, Fe, Ga), $MF_4$ (M=Zr, Pt), and combinations thereof.

In some preferred embodiments, the intercalating agent includes an alkali metal salt selected from lithium perchlorate ($LiClO_4$), sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), a sodium ionic liquid salt, lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The intercalating agent may include an organic solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, or a combination thereof.

DETAILED DESCRIPTION OF PREFERRED EMBODIMENTS

Figure 1:
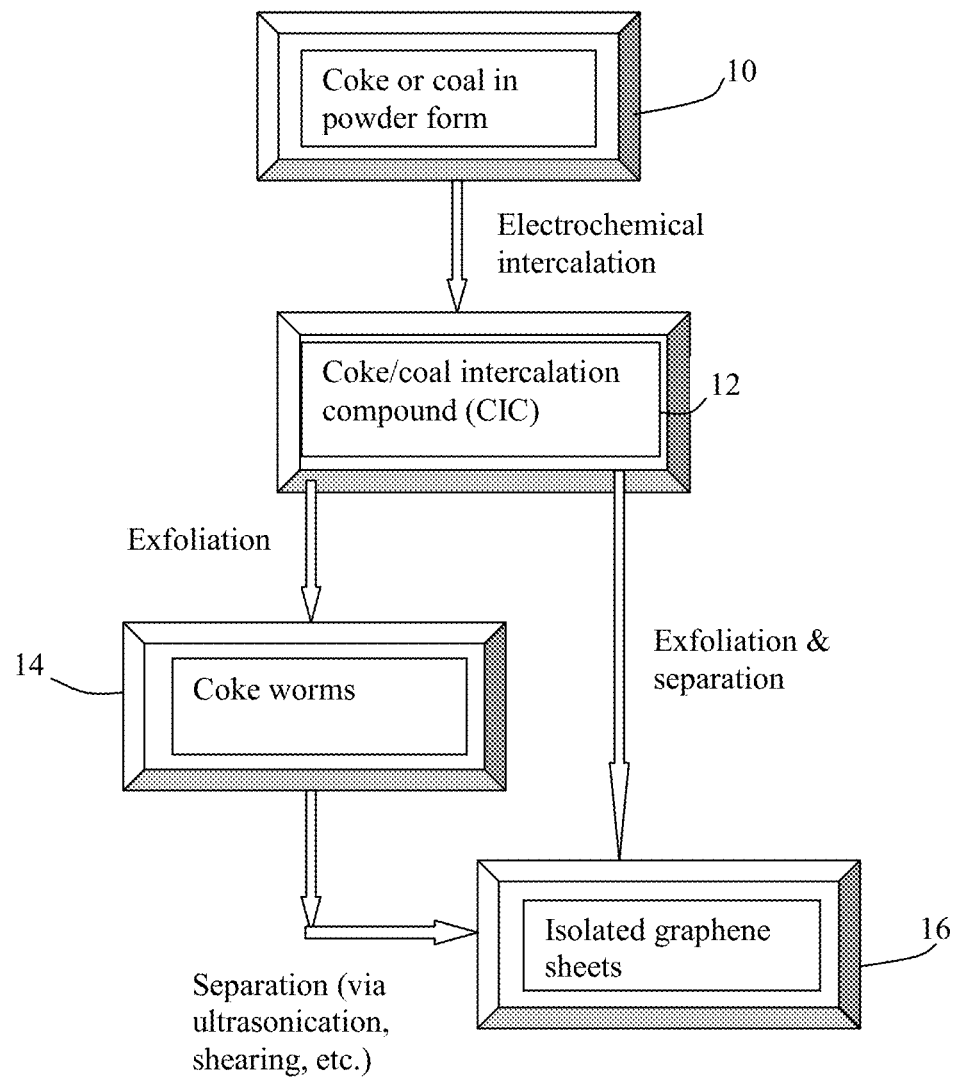
FIG. 1 A flow chart showing an embodiment of the presently invented method of producing isolated graphene sheets.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic structure."

Basically, a graphite material is composed of many graphene planes (hexagonal carbon atomic interlayers) stacked together having inter-planar spacing. These graphene planes can be exfoliated and separated to obtain isolated graphene sheets that can each contain one graphene plane or several graphene planes of hexagonal carbon atoms. Further, natural graphite refers to a graphite material that is produced from purification of graphite mineral (mined graphite ore or graphite rock) typically by a series of flotation and acid treatments. Particles of natural graphite are then subjected to intercalation/oxidation, expansion/exfoliation, and separation/isolation treatments as discussed in the Background section. The instant invention obviates the need to go through the graphite purification procedures that otherwise generate great amounts of polluting chemicals. In fact, the instant invention avoids the use of natural graphite all together as a starting material for the production of graphene sheets. Instead, we begin with coal and its derivatives (including coke, particularly needle coke). No undesirable chemicals, such as concentrated sulfuric acid, nitric acid, and potassium permanganate, are used in the presently invented method.

One preferred specific embodiment of the present invention is a method of producing isolated graphene sheets, also called nano graphene platelets (NGPs), directly from coal powder without purification. We have surprisingly discovered that powder of coal (e.g. leonardite or lignite coal) contains therein graphene-like domains or aromatic molecules that span from 5 nm to 1 μm in length or width. These graphene-like domains contain planes of hexagonal carbon atoms and/or hexagonal carbon atomic interlayers with an interlayer spacing. These graphene-like planes or molecules or interlayers are typically interconnected with disordered chemical groups containing typically C, O, N, P, and/or H. The presently invented method is capable of intercalating, exfoliating, and separating the interlayers and/or separating graphene-like planes or domains from the surrounding disordered chemical species to obtain isolated graphene sheets.

Each graphene sheet comprises one or multiple planes of two-dimensional hexagonal structure of carbon atoms. Each graphene sheet has a length and a width parallel to the graphene plane and a thickness orthogonal to the graphene plane. By definition, the thickness of an NGP is 100 nanometers (nm) or smaller (more typically <10 nm and most typically and desirably <3.4 nm, with a single-sheet NGP (single-layer graphene) being as thin as 0.34 nm. The length and width of a NGP are typically between 5 nm and 10 μm, but could be longer or shorter. Generally, the graphene sheets produced from the coal or coke powder using the presently invented method are single-layer graphene or few-layer graphene (2-10 graphene planes stacked together).

Generally speaking, as schematically shown in FIG. 1, a method has been developed for converting a coke or coal powder 10 to isolated grapheneسheets 16 having an average thickness smaller than 10 nm, more typically smaller than 5 nm, and further more typically thinner than 3.4 nm (in many cases, mostly single-layer graphene). The method comprises (a) forming an intercalated coke or coal compound 12 by an electrochemical intercalation procedure conducted in a reactor, which contains (i) a liquid solution electrolyte containing an intercalating agent and a graphene plane-wetting agent dissolved therein; (ii) a working electrode (e.g. anode) comprising multiple particles of coal or coke powder 10 immersed in the liquid solution electrolyte; and (iii) a counter electrode (e.g. a cathode comprising a metal or graphite rod) and wherein a current is imposed upon the working electrode and the counter electrode at a current density for a duration of time sufficient for effecting the electrochemical intercalation; and (b) exposing the intercalated coke or coal compound 12 to a thermal shock, a water solution exposure, and/or an ultrasonication (or other mechanical shearing) treatment.

In this Step (b), thermal shock exposure may be conducted if some organic species have been intercalated into inter-graphene plane spaces to produce separated graphene sheets. If the anode contains Stage-1 intercalation coke compounds, thermal shock alone can produce separated graphene sheets 16. Otherwise, thermal shock leads to the formation of exfoliated coke 14 (also referred to as coke worms), which is then subjected a mechanical shearing treatment or ultrasonication to produce the desired isolated graphene sheets 16. If the intercalation compounds contain mainly alkali metal ions (Li, Na, and/or K) residing in inter-graphene plane spaces, the resulting alkali metal-intercalated compounds may be immersed in water or water-alcohol solution (with or without sonication) to effect exfoliation and separation of graphene sheets.

The exfoliation step preferably comprises heating the intercalated compound to a temperature in the range of 300-1,200° C. for a duration of 10 seconds to 2 minutes, most preferably at a temperature in the range of 600-1,000° C. for a duration of 30-60 seconds. The exfoliation step in the instant invention does not involve the evolution of undesirable species, such as $NO_x$ and $SO_x$, which are common by-products of exfoliating conventional sulfuric or nitric acid-intercalated graphite compounds.

Figure 2:
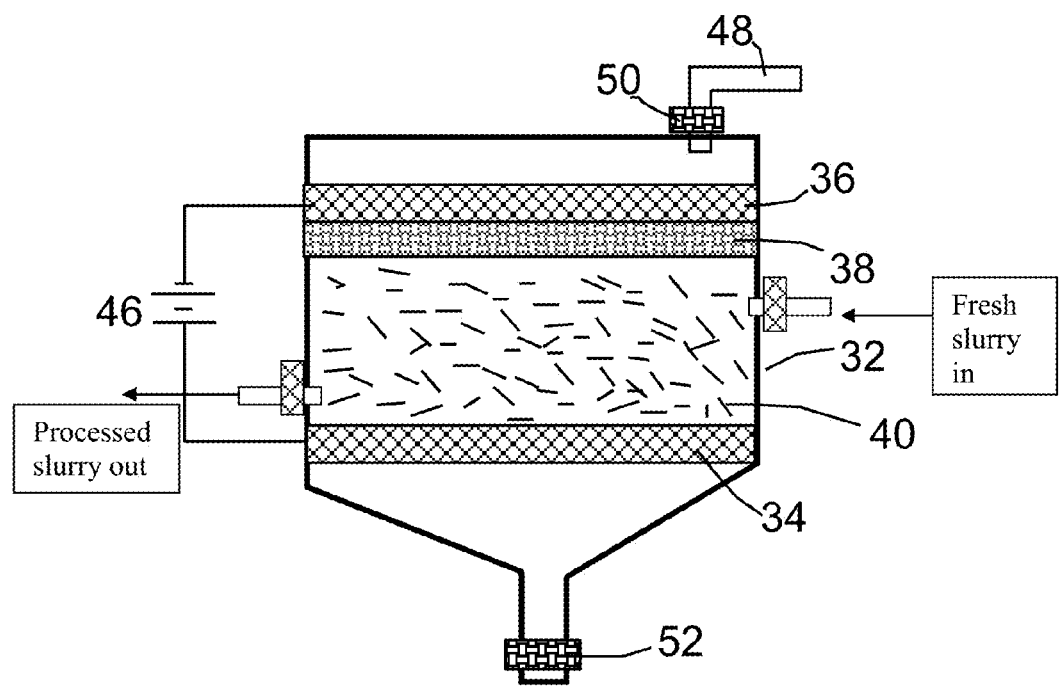
FIG. 2 Schematic drawing of an apparatus for electrochemical intercalation of coal or coke.

Schematically shown in FIG. 2 is an apparatus (as an example) that can be used for electrochemical intercalation of coke or coal according to a preferred embodiment of the present invention. The apparatus comprises a container 32 to accommodate electrodes and electrolyte. The anode is comprised of multiple coke or coal powder particles 40 that are dispersed in a liquid solution electrolyte (e.g., sodium (ethylenediamine) mixed with NaCl-water solution) and are supported by a porous anode supporting element 34, preferably a porous metal plate, such as nickel, titanium, or stainless steel. The powder particles 40 preferably form a continuous network of electron-conducting pathways with respect to the anode support plate 34, but are accessible to the intercalate in the liquid electrolyte solution. In some preferred embodiments, such a network of electron-conducting pathways may be achieved by dispersing and packing >20% by wt. of coke or coal powder (preferably >30% by wt. and more preferably >40% by wt.), plus some optional conductive fillers, in the electrolyte. An electrically insulating, porous separator plate 38 (e.g., Teflon fabric or glass fiber mat) is placed between the anode and the cathode 36 to prevent internal short-circuiting. A DC current source 46 is used to provide a current to the anode support element 34 and the cathode 36. The imposing current used in the electrochemical reaction preferably provides a current density in the range of 1.0 to 600 A/m², more preferably in the range of 10 to 400 A/m². Fresh electrolyte (intercalate) may be supplied from an electrolyte source (not shown) through a pipe 48 and a control valve 50. Excess electrolyte may be drained through a valve 52. In some embodiments, the electrolyte can contain the coal or coke powder dispersed therein and an additional amount of this coke/coal powder-containing electrolyte (appearing like a slurry) may be continuously or intermittently introduced into the intercalation chamber. This will make a continuous process.

Thus, in some embodiments, the invention provides a method of producing isolated graphene sheets having an average thickness smaller than 10 nm (mostly less than 2 nm) directly from a graphite mineral material having hexagonal carbon atomic interlayers with an interlayer spacing, the method comprising:

(a) forming an intercalated coke/coal compound by an electrochemical intercalation procedure which is conducted in an intercalation reactor, wherein the reactor contains (i) a liquid solution electrolyte comprising an intercalating agent and a graphene plane-wetting agent (briefly "wetting agent") dissolved therein; (ii) a working electrode (e.g. anode) that contains the coke/coal powder as an active material in ionic contact with the liquid solution electrolyte; and (iii) a counter electrode (e.g. cathode) in ionic contact with the liquid solution electrolyte, and wherein a current is imposed upon the working electrode and the counter electrode at a current density for a duration of time sufficient for effecting electrochemical intercalation of the intercalating agent and/or the wetting agent into the interlayer spacing, wherein the wetting agent is selected from melamine, ammonium sulfate, sodium dodecyl sulfate, sodium (ethylenediamine), tetraalkyammonium, ammonia, carbamide, hexamethylenetetramine, organic amine, pyrene, 1-pyrenecarboxylic acid (PCA), 1-pyrenebutyric acid (PBA), 1-pyrenamine (PA), poly(sodium-4-styrene sulfonate), or a combination thereof; and (b) exfoliating and separating the hexagonal carbon atomic interlayers from the intercalated coal/coke compound using an ultrasonication, thermal shock exposure, mechanical shearing treatment, or a combination thereof to produce the isolated graphene sheets.

Preferably, the concentration of the coke/coal powder in the liquid solution electrolyte is sufficiently high to achieve a network of electron-conducting pathways, which are in electronic contact with an anode (e.g. via an anode current collector), but not with a cathode.

In an alternative electrochemical intercalation configuration, all the coke/coal powder materials to be intercalated and then exfoliated may be formed into a rod or plate that serves as an anode electrode. A metal or graphite rod or plate serves as a cathode. Both the anode and the cathode are in contact with or dispersed in a liquid solution electrolyte containing an intercalating agent and a wetting agent dissolved therein. In this alternative configuration, no coke/coal material to be intercalated is dispersed in the liquid electrolyte. A current is then imposed to the anode and the cathode to allow for electrochemical intercalation of the intercalating agent and/or the graphene plane wetting agent into the anode active material (the coke/coal material). Under favorable conditions (e.g. sufficiently high current density), exfoliation of coke/coal powder directly into graphene sheets occur. Alternatively and preferably, the electrochemical intercalation conditions are meticulously controlled to accomplish intercalation (for forming the intercalated compound) without exfoliation. The intercalated compound is then exfoliated by using the procedures described in step (b). Such a two-step procedure is preferred over the direct exfoliation procedure because the latter often occurs in an uncontrollable manner and the electrode (e.g. anode) can be broken or disrupted before intercalation into the entire rod can be completed.

The mechanical shearing treatment, used to further separate graphite flakes and possibly reduce the flake size, preferably comprises using air milling (including air jet milling), ball milling, mechanical shearing (including rotating blade fluid grinding), any fluid energy based size-reduction process, ultrasonication, or a combination thereof.

The intercalating agent may contain a Brønsted acid selected from phosphoric acid ($H_3PO_4$), dichloroacetic ($Cl_2CHCOOH$), or an alkylsulfonic acid selected from methanesulfonic ($MeSO_3H$), ethanesulfonic ($EtSO_3H$), or 1-propanesulfonic (n-$PrSO_3H$), or a combination thereof.

In certain embodiments, the intercalating agent includes a metal halide. More specifically, the intercalating agent includes a metal halide selected from the group consisting of MCl (M=Li, Na, K, Cs), $MCl_2$ (M=Zn, Ni, Cu, Mn), $MCl_3$ (M=Al, Fe, Ga), $MCl_4$ (M=Zr, Pt), $MF_2$=Zn, Ni, Cu, Mn), $MF_3$ (M=Al, Fe, Ga), $ME_4$ (M=Zr, Pt), and combinations thereof.

Alternatively, the intercalating agent can include an alkali metal salt and this salt can be dispersed in an organic solvent or an ionic liquid. Preferably, the alkali metal salt is selected from lithium perchlorate (li$ClO_4$), sodium perchlorate (Na$ClO_4$), potassium perchlorate (K$ClO_4$), sodium hexafluorophosphate (Na$PF_6$), potassium hexafluorophosphate (K$PF_6$), sodium borofluoride (Na$BF_4$), potassium borofluoride (K$BF_4$), sodium hexafluoroarsenide, potassium hexafluoroarsenide, sodium trifluoro-metasulfonate (Na$CF_3SO_3$), potassium trifluoro-metasulfonate (K$CF_3SO_3$), bis-trifluoromethyl sulfonylimide sodium (NaN($CF_3SO_2)_2$), sodium trifluoromethanesulfonimide (NaTF SI), bis-trifluoromethyl sulfonylimide potassium (KN($CF_3SO_2)_2$), a sodium ionic liquid salt, lithium perchlorate (Li$ClO_4$), lithium hexafluorophosphate (Li$PF_6$), lithium borofluoride (Li$BF_4$), lithium hexafluoroarsenide (Li$AsF_6$), lithium trifluoro-metasulfonate (Li$CF_3SO_3$), bis-trifluoromethyl sulfonylimide lithium (LiN($CF_3SO_2)_2$), lithium bis(oxalato)borate (Li-BOB), lithium oxalyldifluoroborate (Li$BF_2C_2O_4$), lithium oxalyldifluoroborate (Li$BF_2C_2O_4$), lithium nitrate (Li$NO_3$), Li-Fluoroalkyl-Phosphates (Li$PF_3(CF_2CF_3)_3$), lithium bisperfluoro-ethysulfonylimide (LiBETI), lithium bis(trifluoromethanesulphonyl)imide, lithium bis(fluorosulphonyl) imide, lithium trifluoromethanesulfonimide (LiTFSI), an ionic liquid lithium salt, or a combination thereof.

Preferably, the organic solvent used to dissolve the alkali metal salt is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, propylene carbonate, ethylene carbonate (EC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, or a combination thereof. Essentially all of these solvents can be used in the present electrochemical intercalation method to facilitate intercalation of alkali metal ions (e.g. $Li^+$, $Na^+$, or $K^+$) into inter-graphene plane spaces. Under favorable electrochemical conditions, most of these organic solvents are capable of intercalating into these inter-planar spaces.

The wetting agent is selected from melamine, ammonium sulfate, sodium dodecyl sulfate, sodium (ethylenediamine), tetraalkyammonium, ammonia, carbamide, hexamethylenetetramine, organic amine, poly(sodium-4-styrene sulfonate), or a combination thereof. We have surprisingly observed several advantages that can be achieved by adding a wetting agent in the electrolyte, in addition to an intercalating agent. Typically, the addition of a wetting agent to the liquid solution electrolyte leads to thinner graphene sheets as compared to the electrochemical intercalation electrolyte containing no wetting agent. This is reflected by the typically larger specific surface areas of the mass of graphene sheets produced after exfoliation as measured by the well-known BET method. It seems that the wetting agent can readily spread into inter-layer spaces, stick to a graphene plane, and prevent graphene sheets, once formed, from being re-stacked together. This is a particularly desirable feature considering the fact that graphene planes, when separated, have a great tendency to re-stack again. The presence of these graphene plane wetting agents serves to prevent re-stacking of graphene sheets.

Some of the wetting agents (e.g. those containing an amine group) also serve to chemically functionalize the isolated graphene sheets, thereby improving the chemical or mechanical compatibility of the graphene sheets with a matrix resin (e.g. epoxy) in a composite material.

It is quite surprising that sodium ions and potassium ions, albeit significantly larger than lithium ions in terms of ionic radii, can be intercalated into inter-graphene spaces of all kinds of coke/coal materials using the instant electrochemical configurations and method. Further unexpectedly, mixed ions (e.g. $Li^+ + Na^+$, or $Li^+ + K^+$) intercalated into inter-graphene plane spacing of a coke/coal material are more effective than single-ion species (e.g. $Li^+$ only) in exfoliating graphite to form thinner graphene sheets.

We have found that the invented electrochemical intercalation (with certain alkali metal salts and certain solvents and/or wetting agent) and thermal exfoliation can led to the formation of graphene sheets with an average thickness smaller than 5 nm. However, stage-2 and stage-3 coke intercalation compounds can lead to graphene platelets thicker than 5 nm. In order to further reduce the platelet thickness, we have conducted further studies and found that repeated electrochemical intercalations/exfoliations are an effective method of producing ultra-thin graphene sheets with an average thickness smaller than 2 nm or 5 graphene planes in each sheet or platelet and, in many cases, mostly single-layer graphene.

It may be noted that, in a coke intercalation compound (CIC) obtained by intercalation of a coke material (e.g. needle coke), the intercalant species may form a complete or partial layer in an inter-layer space or gallery. If there always exists one graphene layer between two neighboring intercalant layers, the resulting coke is referred to as a Stage-1 CIC (i.e. on average, there is one intercalation layer per one graphene plane). If n graphene layers exist between two intercalant layers, we have a Stage-n CIC. Alkali metal-intercalated coke compounds were found to be stage-2, stage-3, stage-4, or stage-5, depending on the type of intercalating agents used. It is generally believed that a necessary condition for the formation of all single-layer graphene from graphite (not coal or coke) is to have a perfect Stage-1 GIC (graphite intercalation compound) for exfoliation. Even with a Stage-1 GIC, not all of the graphene layers get exfoliated for reasons that remain unclear. Similarly, exfoliation of a Stage-n GIC (with n>5) tends to lead to a wide distribution of graphene sheet thicknesses (mostly much greater than n layers). In other words, exfoliation of Stage-5 GICs often yields graphene sheets much thicker than 10 or 20 layers. Hence, a major challenge is to be able to consistently produce graphene sheets with well-controlled dimensions (preferably ultra-thin) from acid-intercalated graphite. In this context, it was surprising for us to discover that the instant method can consistently lead to the formation of few-layer graphene and/or single-layer graphene using electrochemical methods and without using undesirable chemicals such as concentrated sulfuric acid. The production yield is typically higher than 70%, more typically higher than 80%, and most typically higher than 90%.

The following examples serve to provide the best modes of practice for the present invention and should not be construed as limiting the scope of the invention:

EXAMPLE 1

Production Of Isolated Graphene Sheets From Milled Needle Coke Powder

Needle coke, milled to an average length <10 μm, was used as the anode material and 1,000 mL of a liquid solution electrolyte (typically 0.5-3 M of an alkali metal salt in an organic solvent). Ethylene carbonate (EC), propylene carbonate (PC), and diethyl carbonate (DEC) were used as the solvent. The alkali metal salts used in this example include lithium perchlorate ($LiClO_4$), sodium perchlorate ($NaClO_4$), potassium perchlorate ($KClO_4$), and their mixtures. The graphene plane wetting agents selected include melamine, sodium (ethylenediamine), and hexamethylenetetramine.

The anode supporting element is a stainless steel plate and the cathode is a graphite foam of approximately 4 cm in diameter and 0.2 cm in thickness, impregnated with lithium or sodium. The separator, a glass fiber fabric, was used to separate the cathode plate from the milled needle coke particles and to compress these particles down against the anode supporting element to ensure that the particles are in a good electrical contact with the anode supporting element to serve as the anode. The electrodes, electrolyte, and separator are contained in a Buchner-type funnel to form an electrochemical cell. The anode supporting element, the cathode, and the separator are porous to permit intercalate (contained in the electrolyte) to saturate the coke and to pass through the cell from top to bottom.

The milled needle coke particles were subjected to an electrochemical charging treatment (i.e. charging alkali metal ions into inter-graphene plane spaces in a coke structure at a current of 0.5 amps (current density of about 0.04 amps/cm$^2$) and at a cell voltage of about 4-6 volts for 2-5 hours. These values may be varied with changes in cell configuration and makeup. Following electrochemical charging treatment, the resulting intercalated particles (beads) were washed with water and dried.

Subsequently, some of the alkali metal ion-intercalated coke compound was transferred to a water bath. The compound, upon contact with water, was found to induce extremely rapid and high expansions of graphite crystallites. Subsequently, some portion of this expanded/exfoliated graphite solution was subjected to sonication. Various samples were collected with their morphology studied by SEM and TEM observations and their specific surface areas measured by the well-known BET method.

TABLE 1

Results of varying types of liquid electrolytes
(alkali metal salts, solvents, and wetting agents).

| Sample | Intercalating agents | Wetting agent | Specific surface area (m²/g) | Comments |
|---|---|---|---|---|
| K-1 | $LiClO_4$ in EC | None | 825 | >80% single-layer |
| K-1-w | $LiClO_4$ in EC | Melamine | 898 | >85% single-layer |
| K-2 | $NaClO_4$ in EC | None | 820 | >80% single-layer |
| K-2-w | $NaClO_4$ in EC | Melamine | 944 | >90% single-layer |
| K-3 | $KClO_4$ in EC | None | 635 | >45% single-layer |
| K-3-w | $KClO_4$ in EC | Melamine | 720 | >65% single-layer |
| K-4 | $(LiClO_4 + NaClO_4)$ in EC | None | 912 | >90% single-layer |
| K-4-w | $(LiClO_4 + NaClO_4)$ in EC | Sodium (ethylenediamine) | 995 | >95% single-layer |
| K-5 | $(LiClO_4 + KClO_4)$ in EC | None | 735 | >70% single-layer |
| K-5-w | $(LiClO_4 + KClO_4)$ in EC | Sodium (ethylenediamine) | 845 | >80% single-layer |
| K-6 | $NaClO_4$ + PC | None | 695 | >60% single-layer |
| K-6-w | $NaClO_4$ + PC | Hexamethylene tetramine | 855 | >85% single-layer |
| K-7 | $LiClO_4$ + PC | None | 660 | >50% single-layer |
| K-7-w | $LiClO_4$ + PC | Hexamethylene tetramine | 788 | >75% single-layer |

Several important observations may be made from the data in this table:

1) The intercalating electrolyte containing a graphene plane wetting agent leads to thinner (mostly single-layer) graphene sheets as compared to the electrolyte containing no such wetting agent.
2) Larger alkali metal ions ($Na^+$ and $K^+$), relative to $Li^+$, are also effective intercalants in the production of ultra-thin graphene sheets. Actually, $Na^+$ ions are unexpectedly more effective than $Li^+$ in this aspect.
3) A mixture of two alkali metal salts (e.g. $LiClO_4$+ $NaClO_4$) is more effective than single components alone in producing single-layer graphene sheets.
4) EC appears to be more effective than PC.
5) Products containing a majority of graphene sheets being single-layer graphene can be readily produced using the presently invented electrochemical intercalation method.

Certain amounts of the mostly multi-layer graphene sheets were then subjected to re-intercalation under comparable electrochemical intercalation conditions to obtain re-intercalated NGPs. Subsequently, these re-intercalated NGPs were transferred to an ultrasonication bath to produce ultra-thin graphene sheets. Electron microscopic examinations of selected samples indicate that the majority of the resulting NGPs are single-layer graphene sheets.

COMPARATIVE EXAMPLE 1

Concentrated Sulfuric-nitric Acid-intercalated Needle Coke Particles

One gram of milled needle coke powder as used in Example 1 were intercalated with a mixture of sulfuric acid, nitric acid, and potassium permanganate at a weight ratio of 4:1:0.05 (graphite-to-intercalate ratio of 1:3) for four hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated at 1,000° C. for 45 seconds. The resulting NGPs were examined using SEM and TEM and their length (largest lateral dimension) and thickness were measured. It was observed that, in comparison with the conventional strong acid process for producing graphene, the presently invented electrochemical intercalation method leads to graphene sheets of comparable thickness distribution, but much larger lateral dimensions (3-5 μm vs. 200-300 nm). Graphene sheets were made into graphene paper layer using a well-known vacuum-assisted filtration procedure. The graphene paper prepared from hydrazine-reduced graphene oxide (made from sulfuric-nitric acid-intercalated coke) exhibits electrical conductivity values of 11-143 S/cm. The graphene paper prepared from the relatively oxidation-free graphene sheets made by the presently invented electrochemical intercalation exhibit conductivity values of 1,500-3,600 S/cm.

EXAMPLE 2

Graphene Sheets from Milled Lignite Coal Powder

In one example, samples of two grams each of lignite coal were milled down to an average diameter of 25.6 μm. The powder samples were subjected to similar electrochemical intercalation conditions described in Example 1, but with different alkali metal salts and solvents. The lignite coal powder samples were subjected to an electrochemical intercalation treatment at a current of 0.5 amps (current density of about 0.04 amps/cm²) and at a cell voltage of about 5 volts for 3 hours. Following the electrochemical intercalation treatment, the resulting intercalated powder was removed from the electrochemical reactor and dried.

Subsequently, the coal intercalation compound was transferred to a furnace pre-set at a temperature of 950° C. for 45 seconds. The compound was found to induce rapid and high expansions of graphite-like crystallites with an expansion ratio of greater than 30. After a mechanical shearing treatment in a high-shear rotating blade device for 15 minutes, the resulting graphene sheets exhibit a thickness ranging from single-layer graphene sheets to 8-layer graphene sheets based on SEM and TEM observations. Results are summarized in Table 2 below:

TABLE 2

Results of varying types of intercalating agents and wetting agents.

| Sample | Alkali metal salt in solvent | Wetting agent | Specific surface area (m$^2$/g) | Comments |
|---|---|---|---|---|
| L-1 | LiPF$_6$ + PC | None | 733 | >65% single-layer |
| L-1-w | LiPF$_6$ + PC | Tetraalky-ammonium | 795 | >75% single-layer |
| L-2 | (LiPF$_6$ + NaPF$_6$) + PC | None | 786 | >75% single-layer |
| L-2-w | (LiPF$_6$ + NaPF$_6$) + PC | Tetraalky-ammonium | 866 | >85% single-layer |
| L-3 | LiBF$_4$ + PC | None | 674 | >60% single-layer |
| L-3-w | LiBF$_4$ + PC | Carbamide | 755 | >70% single-layer |
| L-4 | LiTFSI + (PC + EC) | None | 679 | >60% single-layer |
| L-4-w | LiTFSI + (PC + EC) | Carbamide | 772 | >70% single-layer |
| L-5 | LiPF$_6$ + DOL | None | 633 | >50% single-layer |
| L-5-w | LiPF$_6$ + DOL | Organic amine | 726 | >65% single-layer |
| L-6 | LiPF$_6$ + DME | None | 669 | >60% single-layer |
| L-6-w | LiPF$_6$ + DME | Organic amine | 779 | >75% single-layer |

It may be noted that the interstitial spaces between two hexagonal carbon atomic planes (graphene planes) are only approximately 0.28 nm (the plane-to-plane distance is 0.34 nm). A skilled person in the art would have predicted that larger molecules and/or ions (K$^+$ vs. Li$^+$) cannot intercalate into interstitial spaces of a layered graphite material. After intensive R&D efforts, we found that electrochemical methods with a proper combination of an alkali metal salt and solvent, and an adequate magnitude of the imposing current density could be used to open up the interstitial spaces in graphene-like domains to accommodate much larger molecules and/or ions. The presence of a graphene plane-wetting agent serves to prevent exfoliated graphene sheets from being re-stacked back to a graphite structure.

Re-intercalation of those multi-layer graphene platelets and subsequent exfoliation resulted in further reduction in platelet thickness, with an average thickness of approximately 0.75 nm (approximately 2 graphene planes on average).

EXAMPLE 3

Production of Isolated Graphene Sheets from Electrochemical Interaction, Exfoliation, and Separation of Milled Petroleum Needle Coke in an Aqueous Electrolyte Solution Samples of two grams each of needle coke powder were milled down to an average length of 36 μm. The powder samples were subjected to electrochemical intercalation in aqueous electrolyte. A broad array of metal halide salts were dissolved in deionized water to form a liquid electrolyte. The wetting agents investigated include ammonia, ammonium sulfate, and sodium dodecyl sulfate. The graphite ore samples were subjected to an electrochemical intercalation treatment at a current of 0.5 amps (current density of about 0.04 amps/cm$^2$) and at a cell voltage of about 1.8 volts for 3 hours. Following the electrochemical intercalation treatment, the resulting intercalated coke (mostly Stage-1 CIC with some Stage-2) was removed from the electrochemical reactor and dried.

Subsequently, the intercalated compound was transferred to a furnace pre-set at a temperature of 1,025° C. for 60 seconds. The compound was found to induce rapid and high expansions of graphite crystallites with an expansion ratio of greater than 80. After a mechanical shearing treatment in a high-shear rotating blade device for 15 minutes, the resulting graphene sheets exhibit a thickness ranging from single-layer graphene sheets to 5-layer graphene sheets based on SEM and TEM observations. Results are summarized in Table 3 below. These data have indicated that a wide variety of metal salts (MCl, MCl$_2$, and MCl$_3$, etc.; M=a metal) dissolved in a select solvent (e.g. water) can be utilized as an intercalating agent in the presently invented method, making this a versatile and environmentally benign approach (e.g. as opposed to the conventional method using strong sulfuric acid and oxidizing agents). It is also surprising to discover that a graphene plane wetting agent can be used to significantly improve the electrochemical intercalation and exfoliation process for the production of ultra-thin graphene sheets.

TABLE 3

Results of varying types of intercalating and wetting agents.

| Sample | Aqueous electrolyte | Wetting agent | Specific surface area (m$^2$/g) | % of single or few-layer graphene sheets (1-10 layers) |
|---|---|---|---|---|
| N-1 | LiCl + water | None | 332 | >35% |
| N-1-w | LiCl + watr | Ammonium sulfate | 454 | >60% |
| N-2 | LiI + water | None | 228 | >20% |
| N-2-w | LiI + water | Ammonium sulfate | 466 | >60% |
| N-3 | NaCl + water | None | 216 | >15% |
| N-3-w | NaCl + water | Sodium dodecyl sulfate | 398 | >50% |
| N-4 | NaF + water | None | 225 | >20% |
| N-4-w | NaF + water | Sodium dodecyl sulfate | 368 | >40% |
| N-5 | NaCl + LiCl + water | None | 276 | >30% |
| N-5-w | NaCl + LiCl + water | Ammonium sulfate | 378 | >40% |
| N-6 | ZnCl$_2$ + water | None | 204 | >15% |

TABLE 3-continued

Results of varying types of intercalating and wetting agents.

| Sample | Aqueous electrolyte | Wetting agent | Specific surface area (m²/g) | % of single or few-layer graphene sheets (1-10 layers) |
|---|---|---|---|---|
| N-6-w | $ZnCl_2$ + water | Ammonia | 374 | >40% |
| N-7 | $FeCl_3$ + water | None | 334 | >35% |
| N-7-w | $FeCl_3$ + water | Ammonia | 465 | >60% |

COMPARATIVE EXAMPLE 3

Conventional Hummers Method

Highly intercalated and oxidized graphite was prepared by oxidation of milled needle coke particles (same as in Example 3) with sulfuric acid, nitrate, and potassium permanganate according to the method of Hummers [U.S. Pat. No. 2,798,878, Jul. 9, 1957]. Upon completion of the reaction (10 hours allowed), the mixture was poured into deionized water and filtered. The sample was then washed with 5% HCl solution to remove most of the sulfate ions and residual salt and then repeatedly rinsed with deionized water until the pH of the filtrate was approximately 5. The intent was to remove all sulfuric and nitric acid residue out of graphite interstices. The slurry was spray-dried and stored in a vacuum oven at 65° C. for 24 hours. The interlayer spacing of the resulting powder was determined by the Debey-Scherrer X-ray technique to be approximately 0.76 nm (7.6 Å), indicating that graphite has been converted into graphite oxide (Stage-1 and Stage-2 GICs). The dried, intercalated compound was placed in a quartz tube and inserted into a horizontal tube furnace pre-set at 1050° C. for 45 seconds. The exfoliated worms were mixed with water and then subjected to a mechanical shearing treatment using a high-shear dispersion machine for 20 minutes. The resulting graphene sheets were found to have a thickness of 2.2-7.9 nm (specific surface areas from 198 to 332 m²/g). These values are not nearly as good as what is achieved by the instant method, which is also more environmentally benign.

EXAMPLE 4

Production of Isolated Graphene Sheets from Anthracite Coal

Taixi coal from Shanxi, China was used as the starting material for the preparation of isolated graphene sheets. The raw coal was ground and sieved to a powder with an average particle size less than 200 µm. The coal powder was further size-reduced for 2.5 h by ball milling, and the diameter of more than 90% of milled powder particles is less than 15 µm after milling. The raw coal powder was treated with hydrochloride in a beaker at 50° C. for 4 h to make modified coal (MC), and then it was washed with distilled water until no was detected in the filtrate. The modified coal was heat treated in the presence of Fe to transform coal into graphite-like carbon. The MC powder and $Fe_2(SO4)_3$ [TX-de:$Fe_2$(SO4)$_3$=16:12.6] was well-mixed by ball milling for 2 min, and then the mixture was subjected to catalytic graphitization at 2400° C. for 2 h under argon.

The coal-derived powder samples were subjected to electrochemical intercalation under conditions that are comparable to those used in Example 1. Subsequently, the intercalated compound was transferred to a furnace pre-set at a temperature of 1,050° C. for 60 seconds. The compound was found to induce rapid and high expansions of graphite crystallites with an expansion ratio of greater than 200. After a mechanical shearing treatment in a high-shear rotating blade device for 15 minutes, the resulting graphene sheets exhibit a thickness ranging from single-layer graphene sheets to 5-layer graphene sheets based on SEM and TEM observations.

EXAMPLE 5

Production of Isolated Graphene Sheets from Bituminous Coal

In an example, 300 mg of bituminous coal was used as the anode material and 1,000 mL and 1 M of an alkali metal salt in an organic solvent as a liquid solution electrolyte. Ethylene carbonate (EC) and propylene carbonate (PC), separately, were used as the solvent. The alkali metal salts used in this example include lithium perchlorate ($LiClO_4$) and sodium perchlorate ($NaClO_4$).

The anode supporting element is a stainless steel plate and the cathode is a graphite foam of approximately 4 cm in diameter and 0.2 cm in thickness, impregnated with lithium or sodium. The separator, a glass fiber fabric, was used to separate the cathode plate from the coal particles and to compress these particles down against the anode supporting element to ensure that the particles are in a good electrical contact with the anode supporting element to serve as the anode. The electrodes, electrolyte, and separator are contained in a Buchner-type funnel to form an electrochemical cell. The anode supporting element, the cathode, and the separator are porous to permit intercalate (contained in the electrolyte) to saturate the coke and to pass through the cell from top to bottom.

The coal particles were subjected to an electrochemical charging treatment at a current of 0.5 amps (current density of about 0.04 amps/cm²) and at a cell voltage of about 4-5 volts for 2 hours. These values may be varied with changes in cell configuration and makeup. Following electrochemical charging treatment, the resulting reacted particles were washed with water. The solution was cooled to room temperature and poured into a beaker containing 100 ml ice, followed by a step of adding NaOH (3M) until the pH value reached 7. The neutral mixture was subjected to cross-flow ultrafiltration for 2 hours. After purification, the solution was concentrated using rotary evaporation to obtain solid humic acid sheets.

The invention claimed is:

1. A method of producing isolated graphene sheets from a supply of coal powder containing therein domains of hexagonal carbon atoms and/or hexagonal carbon atomic interlayers with an interlayer spacing, said method comprising:

(a) forming an intercalated coal compound by an electrochemical intercalation procedure which is conducted in an intercalation reactor, wherein said reactor contains (i) a liquid solution electrolyte comprising an intercalating agent; (ii) a working electrode that contains said coal powder as an active material in ionic contact with said liquid solution electrolyte, wherein said coal powder is selected from leonardite, anthracite, lignite coal, bituminous coal, natural coal mineral powder, or a combination thereof; and (iii) a counter electrode in ionic contact with said liquid solution electrolyte, and wherein a current is imposed upon said working electrode and said counter electrode at a current density for a duration of time sufficient for effecting electrochemical intercalation of said intercalating agent into said interlayer spacing; wherein said intercalating agent comprises an alkali metal or metal halide; wherein said liquid solution electrolyte further comprises a graphene plane-wetting agent selected from the group consisting of melamine, sodium (ethylenediamine), tetraalkylammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), and combinations thereof, and (b) exfoliating and separating said hexagonal carbon atomic interlayers from said intercalated coal compound using an ultrasonication, thermal shock exposure, mechanical shearing treatment, or a combination thereof to produce said isolated graphene sheets.

2. The method of claim 1, wherein multiple particles of said coal powder are dispersed in said liquid solution electrolyte, disposed in a working electrode compartment, and supported or confined by a current collector in electronic contact therewith, and wherein said working electrode compartment and said multiple particles supported thereon or confined therein are not in physical contact with said counter electrode.

3. The method of claim 2, wherein said multiple particles are clustered together to form a network of electron-conducting pathways.

4. The method of claim 1, wherein said method is conducted intermittently or continuously and said supply of coal powder and said liquid solution electrolyte are provided into said reactor intermittently or continuously.

5. The method of claim 1, wherein said coal powder in said working electrode compartment is dispersed in the liquid solution electrolyte at a concentration higher than 20% by weight.

6. The method of claim 1, wherein said coal powder in said working electrode compartment is dispersed in the liquid solution electrolyte at a concentration higher than 50% by weight.

7. The method of claim 1, wherein said mechanical shearing treatment comprises operating air milling, air jet milling, ball milling, rotating-blade mechanical shearing, or a combination thereof.

8. The method of claim 1, wherein the imposing current provides a current density in the range of 0.1 to 600 A/m$^2$.

9. The method of claim 1, wherein the imposing current provides a current density in the range of 1 to 500 A/m$^2$.

10. The method of claim 1, wherein the imposing current provides a current density in the range of 10 to 300 A/m$^2$.

11. The method of claim 1, wherein said thermal shock exposure comprises heating said intercalated coal compound to a temperature in the range of 300-1,200° C. for a period of 15 seconds to 2 minutes.

12. The method of claim 1, wherein said isolated graphene sheets contain single-layer graphene.

13. The method of claim 1, wherein said isolated graphene sheets contain few-layer graphene having 2-10 hexagonal carbon atomic interlayers or graphene planes.

14. The method of claim 1, wherein said electrochemical intercalation includes intercalation of both said intercalating agent and said wetting agent into the interlayer spacing.

15. The method of claim 1, further comprising a step of re-intercalating said isolated graphene sheets using an electrochemical or chemical intercalation method to obtain intercalated graphene sheets and a step of exfoliating and separating said intercalated graphene sheets to produce single-layer graphene sheets using ultrasonication, thermal shock exposure, exposure to water solution, mechanical shearing treatment, or a combination thereof.

16. The method of claim 1, wherein said intercalating agent includes a metal halide selected from the group consisting of MCl (M=Li, Na, K, Cs), MCl$_2$ (M=Zn, Ni, Cu, Mn), MCl$_3$ (M=Al, Fe, Ga), MCl$_4$ (M=Zr, Pt), MF$_2$ (M=Zn, Ni, Cu, Mn), MF$_3$ (M=Al, Fe, Ga), MF$_4$ (M=Zr, Pt), and combinations thereof.

17. The method of claim 1, wherein said intercalating agent comprises an alkali metal salt selected from the group consisting of sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-methanesulfonate (NaCF$_3$SO$_3$), potassium trifluoro-methanesulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), a sodium ionic liquid salt, lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfonylimide (LiBETI), lithium bis(trifluoromethanesulphonyl)imide, lithium bis (fluorosulphonyl)imide, lithium trifluoromethanesulfonimide (LiTFSI), an ionic liquid lithium salt, and combinations thereof.

18. The method of claim 1, wherein said intercalating agent comprises an organic solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), propylene carbonate (PC), dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofloroether, and combinations thereof.

19. A method of producing isolated graphene sheets from a supply of coal powder containing therein domains of hexagonal carbon atoms and/or hexagonal carbon atomic interlayers with an interlayer spacing, said method comprising:

(a) forming an intercalated coal compound by an electrochemical intercalation procedure which is conducted in an intercalation reactor, wherein said reactor contains (i) a liquid solution electrolyte comprising an intercalating agent; (ii) a working electrode that contains said coke or coal powder as an active material in ionic contact with said liquid solution electrolyte, wherein said coal powder is selected from leonardite, anthracite, lignite coal, bituminous coal, natural coal mineral powder, or a combination thereof; and (iii) a counter electrode in ionic contact with said liquid solution electrolyte, and wherein a current is imposed upon said working electrode and said counter electrode at a current density for a duration of time sufficient for effecting electrochemical intercalation of said intercalating agent into said interlayer spacing; wherein said intercalating agent comprises dichloroacetic acid ($Cl_2CHCOOH$), or an alkylsulfonic acid selected from methanesulfonic ($MeSO_3H$), ethanesulfonic ($EtSO_3H$), 1-propanesulfonic (n-$PrSO_3H$), or a combination thereof and (b) exfoliating and separating said hexagonal carbon atomic interlayers from said intercalated coal compound using an ultrasonication, thermal shock exposure, mechanical shearing treatment, or a combination thereof to produce said isolated graphene sheets.

20. The method of claim 19, wherein said reactor further comprises a graphene plane-wetting agent dissolved in said liquid solution electrolyte, wherein said graphene plane-wetting agent is selected from the group consisting of melamine, sodium (ethylenediamine), tetraalkylammonium, ammonia, carbamide, hexamethylenetetramine, organic amine, pyrene, 1-pyrenecarboxylic acid, 1-pyrenebutyric acid, 1-pyrenamine, poly(sodium-4-styrene sulfonate), and combinations thereof.

21. The method of claim 19, wherein said coal powder in said working electrode compartment is dispersed in the liquid solution electrolyte at a concentration from 20% to 50% by weight.

22. The method of claim 19, wherein the imposing current provides a current density in the range of 0.1 to 600 $A/m^2$.

\* \* \* \* \*